(12) United States Patent
Long et al.

(10) Patent No.: US 8,717,946 B2
(45) Date of Patent: *May 6, 2014

(54) METHOD AND DEVICE FOR HOLDING CALLS BETWEEN NETWORKS

(75) Inventors: Shuiping Long, Shenzhen (CN); Hui Jin, Shenzhen (CN); Xiaoyan Duan, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/552,145

(22) Filed: Jul. 18, 2012

(65) Prior Publication Data

US 2012/0281595 A1 Nov. 8, 2012

Related U.S. Application Data

(63) Continuation of application No. 12/914,267, filed on Oct. 28, 2010, which is a continuation of application No. PCT/CN2009/071443, filed on Apr. 24, 2009.

(30) Foreign Application Priority Data

Apr. 30, 2008 (CN) .......................... 2008 1 0093832

(51) Int. Cl.
*H04L 12/16* (2006.01)

(52) U.S. Cl.
USPC .......................................... 370/259; 379/393

(58) Field of Classification Search
USPC ..................... 370/259, 329, 352; 379/251.01; 455/451
See application file for complete search history.

(56) References Cited

U.S. PATENT DOCUMENTS

| 6,836,478 B1 * | 12/2004 | Huang et al. .................. 370/352 |
| 2002/0122401 A1 | 9/2002 | Xiang et al. |
| 2005/0237952 A1 * | 10/2005 | Punj et al. ..................... 370/260 |

(Continued)

FOREIGN PATENT DOCUMENTS

| CN | 1925524 | 3/2007 |
| CN | 1949752 | 4/2007 |

(Continued)

OTHER PUBLICATIONS

*3rd Generation Partnership Project; Technical Specification Group Services and System Asp; IP Multimedia Subsystem (IMS) Centralized Services; Stage 2 (Release 8)*, 3GPP TS 23.292 V0.2.0, Jan. 2008, pp. 1-11.

(Continued)

*Primary Examiner* — Yemane Mesfin
*Assistant Examiner* — Henry Baron
(74) *Attorney, Agent, or Firm* — Huawei Technologies Co., Ltd.

(57) ABSTRACT

A method and a device for holding calls between networks are disclosed herein. The method includes: receiving a call hold request sent by a UE in a CS network, where the call hold request carries an indication that the UE in the CS network will continue sending media streams; and instructing a peer device to keep receiving the media streams from the UE in the CS network and stop sending the media streams. In the technical solution under the present invention, the UE in the CS network partially releases the radio resources after initiating the call hold operation, and therefore, the UE in the CS network can play local media files to the peer device after the call is held, thus saving network resources and improving the user experience.

7 Claims, 4 Drawing Sheets

(56) References Cited

U.S. PATENT DOCUMENTS

| | | | |
|---|---|---|---|
| 2006/0168266 A1* | 7/2006 | Phillips et al. | 709/230 |
| 2007/0165605 A1 | 7/2007 | Nguyen | |
| 2009/0201922 A1 | 8/2009 | Long et al. | |
| 2010/0040218 A1* | 2/2010 | Shen et al. | 379/212.01 |
| 2011/0194461 A1* | 8/2011 | Hu et al. | 370/259 |
| 2011/1194461 | 8/2011 | Hu et al. | |

FOREIGN PATENT DOCUMENTS

| | | |
|---|---|---|
| CN | 1993961 | 7/2007 |
| CN | 101001470 | 7/2007 |
| CN | 101026573 | 8/2007 |
| CN | 101111086 | 1/2008 |
| CN | 101141812 | 3/2008 |
| CN | 101527891 | 4/2011 |
| EP | 1887752 | 2/2008 |
| WO | 2004/102943 | 11/2004 |
| WO | 2006/010614 | 2/2006 |

OTHER PUBLICATIONS

3*rd* *Generation Partnership Project; Technical Specification Group Services and System Aspects; IP Multimedia Subsystem (IMS) Centralized Services; (Release 8)*, 3GPP TR 23.892 V0.5.6, May 2007, pp. 1-71.

*ICS UE Communication Hold over Gm-Flow*, 3GPP TSG SA WG2 Meeting #64, Jeju, South Korea, Apr. 7-11, 2008, pp. 1-2.

International Search Report, mailed Jul. 16, 2009, in corresponding International Application No. PCT/CN2009/071443 (2 pp.).

Written Opinion of the International Searching Authority, mailed Jul. 16, 2009, in corresponding International Application No. PCT/CN2009/071443 (3 pp.).

US Office Action issued Nov. 9, 2012 in related copending parent U.S. Appl. No. 12/914,267 (15 pages).

US Office Action mailed May 9, 2013 in parent U.S. Appl. No. 12/914,267 (9 pages).

* cited by examiner

METHOD AND DEVICE FOR HOLDING CALLS BETWEEN NETWORKS

CROSS-REFERENCE TO RELATED APPLICATIONS

This application is a continuation of U.S. patent application Ser. No. 12/914,267, filed on Oct. 28, 2010, which is a continuation of International Application No. PCT/CN2009/071443, filed on Apr. 24, 2009, which claims priority to Chinese Patent Application No. 200810093832.7, filed on Apr. 30, 2008, both of which are hereby incorporated by reference in their entireties.

FIELD OF THE INVENTION

The present invention relates to mobile communication, and in particular, to a method and a device for holding calls between networks.

BACKGROUND

IP Multimedia Subsystem (IMS) is an IP multimedia service support subsystem put forward in release 5 of the $3^{rd}$ Generation Partnership Project (3GPP) in order to provide multimedia services for mobile users through the Internet. The IMS is characterized by the following features: (1) an IP-based multimedia service and session control core network; (2) a public platform that supports various integrated services and is independent of any access technology and access mode; (3) use of a flexible Session Initiation Protocol (SIP) and standardized open interfaces, which makes it possible to support a wide range of services; (4) definition and perfection by multiple standardization organizations (the 3GPP/3GPP 2 defines the IMS network components and infrastructure, and accomplishes concordance as far as possible; the International Telegraph Union-Telecommunication Standardization Sector (ITU-T) and the European Telecommunications Standardization Institute (ETSI) adopt the IMS-based New Generation Network (NGN) or Next Generation Network (NGN) architecture, and make progress on that basis). It is generally believed in the industry that the IMS is a trend for the future.

Most users still use the traditional CS network currently, including PSTN, Integrated Services Digital Network (ISDN), and $2^{nd}$ Generation Global System for Mobile Telecommunication (2G GSM). Therefore, it is important to implement interworking between the IMS network and the CS network, namely, implement the calls between the IMS user and the CS user. Important devices for interworking between the IMS network and the CS network are Media Gateway Control Function (MGCF), IMS Media Gateway (IMS-MGW), and Border Gateway Control Function (BGCF). The MGCF is responsible for interconnection of the control plane, and implements mapping between the SIP signaling and the Bearer Independent Call Control protocol (BICC) or ISDN User Part (ISUP). Accordingly, the IMS-MGW performs protocol conversion on user plane, terminates at the CS network, and provides conversion between the two types of termination. The MGCF uses the H.248 protocol to control the action of the IMS-MGW. The BGCF selects the location of the egress to the CS network when the IMS user initiates a call to a CS network user.

Currently, the CS network service platform is separated from the IMS network service platform, which makes it costly for the operator to operate the network and introduce new services. The IMS Centralized Service (ICS) project currently developed by the 3GPP attempts to let the IMS service platform support both the user CS access and the PS access. The essence of the ICS is: The CS network bears the real-time IMS session media (voice and video), and a transparent control channel is introduced between the User Equipment (UE) and the IMS network to support the IMS service control. The control channel may be implemented through Unstructured Supplementary Service Data (USSD) or SIP, where the USSD is a data communication mechanism of the CS network, and is generally applicable to communication between the UE and the server). An ICS server is introduced into the IMS network to support the ICS. The ICS server communicates with the Serving Call Session Control Function (S-CSCF) through an IP multimedia Subsystem Service Control (ISC) interface.

In the prior art, at the time of setting up a call between the UE in the CS network and the UE in the IMS network, if the UE in the CS network is holding a call, the UE needs to send a call hold request to the CS network to release the radio resources of the UE in the CS network. The call hold announcement has to be played by the CS network to the peer device, which does not meet the requirements in certain service scenarios, for example, the user who leaves the telephone set temporarily expects to send individualized music to the peer user, or the user at a sports event site expects to play the on-site commentary to the peer user without further bidirectional conversation.

SUMMARY

The embodiments of the present invention provide a method and a device for holding calls between networks so that the UE in the CS network releases radio resources partially after initiating a call hold operation and plays media files to the peer device.

The method for holding calls between networks includes:
receiving a call hold request sent by a UE in the CS network, where the call hold request carries an indication that the UE in the CS network will continue sending media streams; and
instructing the peer device to keep receiving the media streams from the UE of the CS network and stop sending the media streams.

A UE provided in an embodiment of the present invention includes:
a sending module, configured to send a call hold request or call retrieval request to an IMS network server; and
a sustaining module, configured to sustain the CS network channel after the sending module sends the call hold request.

An IMS network device provided in an embodiment of the present invention includes:
a receiving module, configured to: receive a call hold request or call retrieval request sent by a UE in the CS network, where the call hold request carries an indication that the UE in the CS network will continue sending media streams; and
a sending module, configured to send a signaling indicative of holding or retrieving the call to the peer device according to the call hold request or call retrieval request received by the receiving module.

Compared with the prior art, the technical solution under the present invention brings the following benefits: The UE in the CS network partially releases the radio resources after initiating the call hold operation. Therefore, the UE in the CS network can play media files to the peer device after the call is held, thus saving network resources and improving the user experience.

DETAILED DESCRIPTION OF THE EMBODIMENTS

The embodiments of the present invention provide a method for holding calls between networks so that the UE in the CS network releases radio resources partially after initiating a call hold operation and plays local media files to the peer device.

The embodiments of the present invention are detailed below with reference to accompanying drawings.

Figure 1:
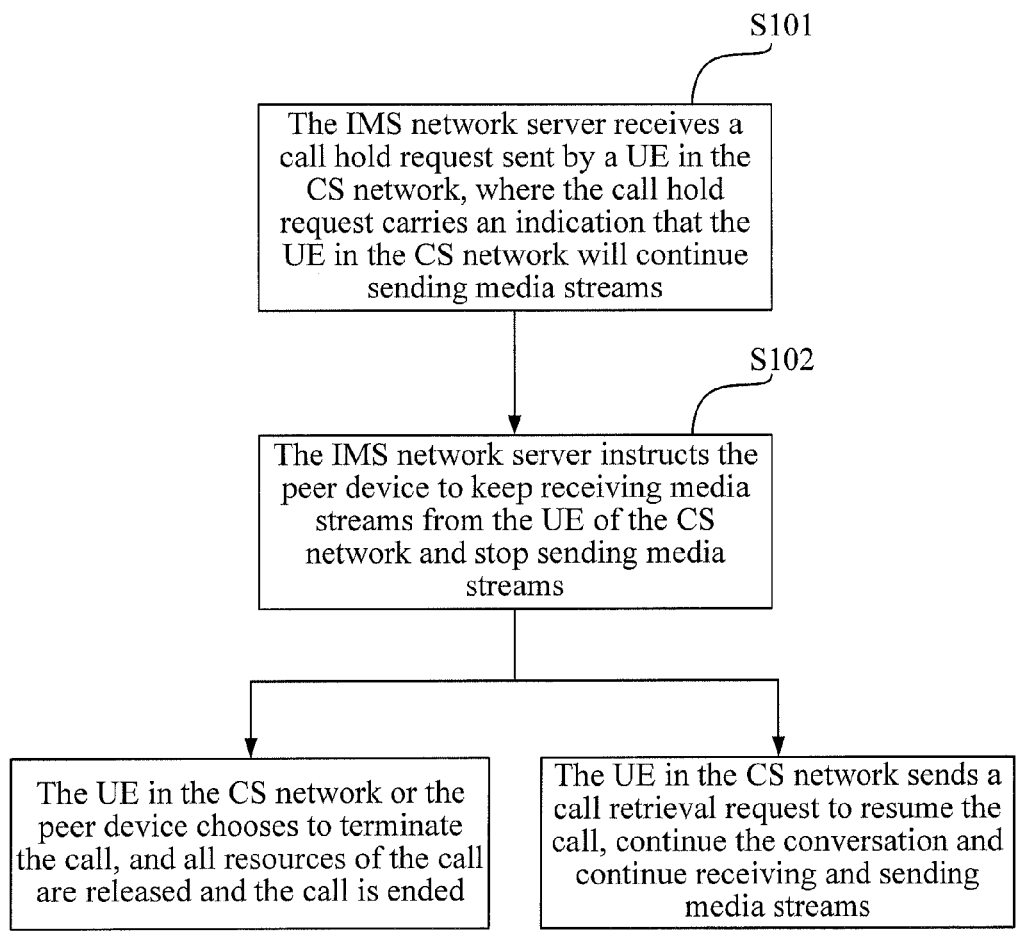
FIG. 1 is a flowchart of holding calls between networks according to the first embodiment of the present invention.

FIG. 1 is a flowchart of holding calls between networks in the first embodiment of the present invention. The method for holding calls between networks includes the following steps:

Step S101: The IMS network server receives a call hold request sent by a UE in the CS network, where the call hold request carries an indication that the UE in the CS network will continue sending media streams.

Specifically, the UE in the CS network is capable of the ICS function, and the call hold request may be sent through a SIP signaling or USSD signaling. The ICS-enabled UE supports PS access and CS access. The UE sends a SIP signaling to the IMS server through PS access, and combines the CS access with the PS access to implement the ICS function. By contrast, the UE in the prior art uses the CS access or PS access independently. Therefore, the technical solution herein saves the operation cost and reduces the cost of introducing new services.

Meanwhile, the UE in the CS network sends a call hold request directly to the IMS network server rather than the CS network device, thus implementing centralized control for the call hold service in the IMS network. Moreover, after the call is held, the UE in the CS network sustains the CS network channel, and goes on receiving and transmitting media streams but stops decoding the received media streams. The media streams may be sent by the UE after the UE performs media coding for the received media signals or after the UE converts the format of the local media file, or the UE sends the local media files directly.

Step S102: The IMS network server instructs the peer device to keep receiving media streams from the UE of the CS network and stop sending media streams. In the prior art, after receiving the hold message forwarded by a Mobile Switching Center (MSC) server, the MGCF converts the hold message into a SIP message which is then sent to the peer device through an S-SCSF.

In the embodiments of the present invention, however, the IMS network server receives the call hold request sent by the UE in the CS network and then sends a request to the peer device, instructing the peer to keep receiving but stop sending media streams.

This step adjusts the media channel of the IMS network, namely, Real-time Transmission Protocol (RTP) channel. As a result, the peer device stops sending media streams but the UE is still capable of receiving media streams. Therefore, media streams are still sent to the UE in the IMS network continuously, for example, for the purpose of playing the local media files of the UE in the CS network.

After the call is held, the UE in the CS network and the UE in the IMS network can choose to terminate the call and release all resources occupied by this call; or the UE in the CS network sends a call retrieval request to recover the call, go on with the conversation, and continue receiving and sending media streams.

The call hold request mentioned here may be sent through a SIP signaling or USSD signaling.

After the call is retrieved, the UE in the CS network recovers the function of decoding the received media streams, and the UE in the IMS network recovers the function of sending media streams.

In the technical solution under the present invention, the UE in the CS network partially releases the radio resources after initiating the call hold operation, and therefore, the UE in the CS network can play media files to the peer device after the call is held, thus saving network resources and improving the user experience.

Figure 2:
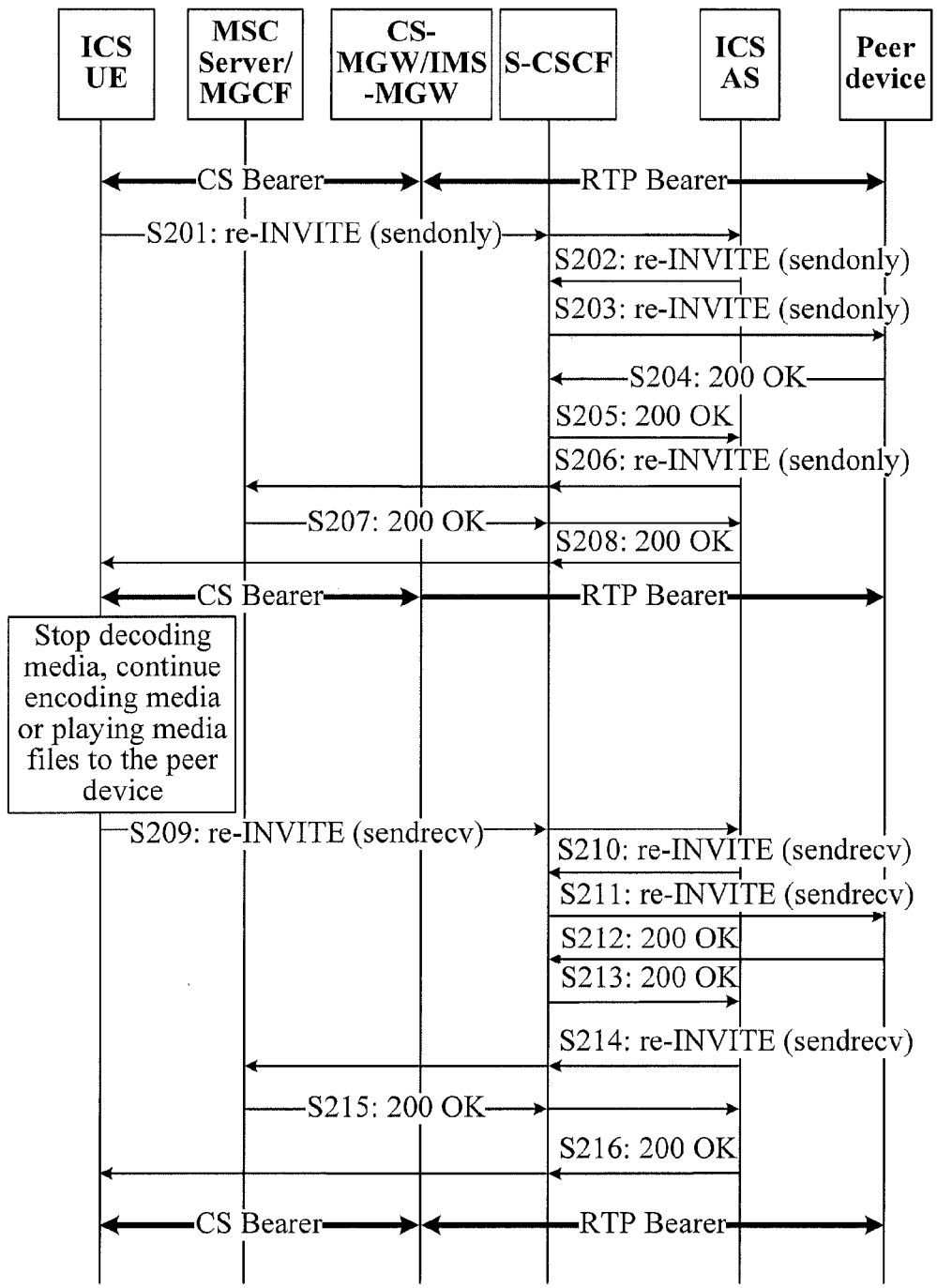
FIG. 2 is a flowchart of holding calls between networks through a SIP signaling according to the second embodiment of the present invention.

In order to make the technical solution under the present invention clearer, the following describes the method of holding calls between networks in more detail with respect to a network signaling exchange process. The second embodiment of the present invention is shown in FIG. 2:

It is worthy of attention that the technical solution under the present invention requires the UE in the CS network to support the ICS function, namely, the UE in the CS network is an ICS UE.

Other network entities are described below:

MSC server: an entity introduced by the softswitch of the CS mobile network, and is capable of MSC call control and mobility management and controlling the CS-MGW to bear media streams of the call. The MSC server communicates with the UE through a layer-3 signaling (such as 24.008 signaling in the 3GPP network) of the mobile network.

IMS-MGW: IMS media gateway, corresponding to the CS-MGW and designed for media streams exchange between the CS network and the IMS network.

MGCF: serving as a controller of the IMS-MGW and converting the SIP signaling of the IMS network and the signaling of the CS network.

The MSC server combines with the MGCF to convert the SIP signaling of the IMS network and the layer-3 signaling of the mobile network, and may be called a signaling conversion server. The signaling conversion server may be an independent network entity.

ICS Application Server (ICS AS): a server that supports ICS in the IMS network, and communicates with the S-CSCF through an ISC interface.

S-CSCF: an entity that implements registration and session control.

Based on the network entities above, the method for holding calls between networks in this embodiment includes the following steps:

Step S201: Through a re-INVITE message, the ICS UE sends a call hold request to the ICS AS.

The re-INVITE is a call hold request of the SIP format. The signaling uses "sendonly" to indicate the signaling format:

(re-INVITE(SDP(a=sendonly))), which means that the ICS UE will continue sending media streams.

The re-INVITE is forwarded to the IMS network server (namely, ICS AS) through an S-CSCF.

Step S202: The ICS AS returns a re-INVITE to the S-CSCF.

Described above is a normal IMS processing process.

Step S203: The S-CSCF sends a re-INVITE to the peer device, namely, the UE in the IMS network.

The signaling uses "sendonly" to instruct the peer device to: hold the call, namely, the UE in the IMS network stops sending media streams to the network; and go on receiving media streams.

Through the foregoing operations, the peer device releases the relevant resources of the media streams in the sending direction.

Step S204: The peer device sends a 200 OK to the S-CSCF as a confirmation.

Step S205: The S-CSCF sends a 200 OK to the ICS AS.

Step S206: The ICS AS sends a re-INVITE to the MGCF through an S-CSCF.

This signaling uses "recvonly" to instruct the MGCF to stop receiving but go on sending the RTP media streams. Correspondingly, the peer device receives but stops sending the media streams.

The MGCF controls the IMS-MGW to stop receiving media streams from the peer device but go on sending media streams to the peer device.

Step S207: The MGCF sends a 200 OK message to the S-CSCF as a confirmation, and the message is forwarded to the ICS AS.

Step S208: The ICS AS sends a 200 OK to the ICS UE through an S-CSCF to confirm success of holding the call.

At this time, the radio air interface resources of the ICS UE still exist, and the ICS UE goes on receiving media stream data, for the purpose of keeping the connection only, without performing other operations; the ICS UE may stop decoding the received media streams, and continue encoding the media signals and sending them to the peer device or playing the local media files to the peer device.

After the call is held, the ICS UE and the peer device (namely, the UE in the CS network and the UE in the IMS network) can choose to terminate the call and release all resources occupied by this call; or the UE in the CS network sends a call retrieval request to recover the call, proceed to step S209, go on with the conversation, and continue receiving and sending media streams.

Step S209: Through a re-INVITE message, the ICS UE sends a call retrieval request to the ICS AS.

The re-INVITE is a call hold request of the SIP format. The signaling uses "sendrecv" to indicate that the ICS UE expects to recover the call and resume receiving and sending media streams.

The re-INVITE is forwarded to the ICS AS through an S-CSCF.

Step S210: The ICS AS returns a re-INVITE to the S-CSCF.

Described above is a normal IMS processing process.

Step S211: The S-CSCF sends a re-INVITE to the peer device.

As well, this signaling uses "sendrecv" to instruct the peer device to resume sending media streams and go on receiving media streams.

Step S212: The peer device sends a 200 OK as a confirmation.

Step S213: The S-CSCF sends a 200 OK to the ICS AS.

Step S214: The ICS AS sends a re-INVITE to the MGCF through an S-CSCF.

This signaling uses "sendrecv" to instruct the MGCF to resume receiving and go on sending the RTP media streams. Correspondingly, the peer device resumes sending the media streams.

The MGCF controls the IMS-MGW to resume receiving media streams from the peer device and go on sending media streams to the peer device.

Step S215: The MGCF sends a 200 OK message to the S-CSCF as a confirmation, and the message is forwarded to the ICS AS.

Step S216: The ICS AS sends a 200 OK to the ICS UE through an S-CSCF to confirm success of retrieving the call.

In the technical solution under the present invention, the UE in the CS network partially releases the radio resources after initiating the call hold operation, and therefore, the UE in the CS network can play local media files to the peer device after the call is held, thus saving network resources and improving the user experience.

Figure 3:
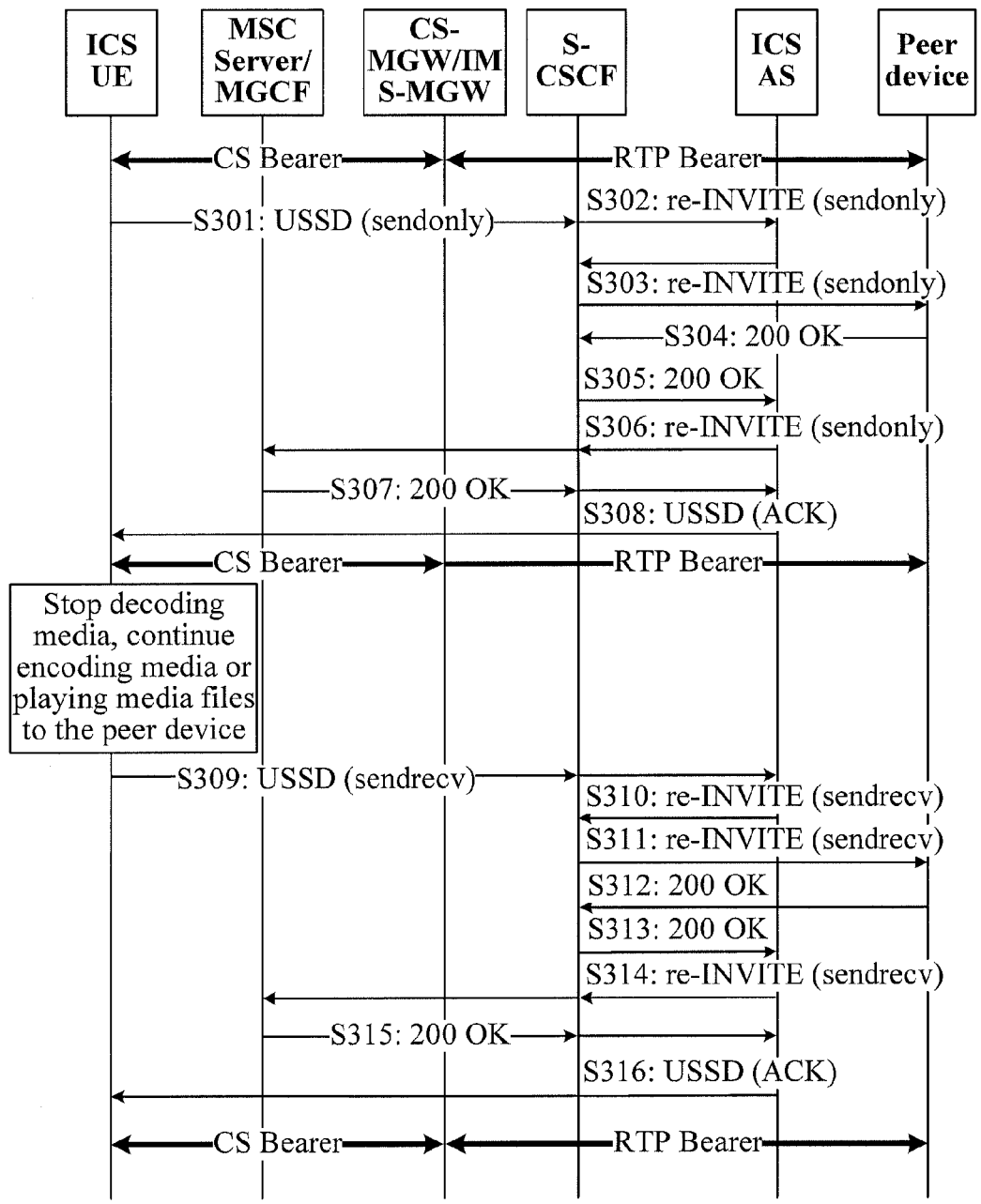
FIG. 3 is a flowchart of holding calls between networks through a USSD signaling according to the third embodiment of the present invention.

It is worthy of attention that in the second embodiment of the present invention, the call hold signaling and the call retrieval signaling are sent through a SIP signaling, but are not limited to the SIP signaling. Alternatively, the call hold operation or the call retrieval operation may be performed through a USSD signaling, which is described in the third embodiment. As shown in FIG. 3, the method in the third embodiment includes the following steps:

Step S301: Through a USSD signaling, the ICS UE sends a call hold request to the ICS AS.

The signaling uses "sendonly" to indicate that the ICS UE will go on sending media streams.

The USSD signaling is forwarded to the IMS network server (namely, ICS AS) through an S-CSCF.

Step S302: The ICS AS returns a re-INVITE to the S-CSCF.

Described above is a normal IMS processing process.

Step S303: The S-CSCF sends a re-INVITE to the peer device, namely, the UE in the IMS network.

The signaling uses "sendonly" to instruct the peer device to: hold the call, namely, the UE in the IMS network stops sending media streams to the network; and go on receiving media streams.

Through the foregoing operations, the peer device releases the relevant resources of the media streams in the sending direction.

Step S304: The peer device sends a 200 OK to the S-CSCF as a confirmation.

Step S305: The S-CSCF sends a 200 OK to the ICS AS.

Step S306: The ICS AS sends a re-INVITE to the MGCF through an S-CSCF.

This signaling uses "recvonly" to instruct the MGCF to stop receiving but go on sending the media streams. Correspondingly, the peer device receives but stops sending the media streams.

The MGCF controls the IMS-MGW to stop receiving media streams from the peer device but go on sending media streams to the peer device.

Step S307: The MGCF sends a 200 OK message to the S-CSCF as a confirmation, and the message is forwarded to the ICS AS.

Step S308: The ICS AS sends a response message of a USSD format to the ICS UE through an S-CSCF to confirm success of holding the call.

At this time, the radio air interface resources of the ICS UE still exist, and the ICS UE goes on receiving media stream data, for the purpose of keeping the connection only; the ICS UE may stop decoding the received media streams, and continue encoding the media signals and sending them to the peer device or playing the local media files to the peer device.

After the call is held, the ICS UE and the peer device (namely, the UE in the CS network and the UE in the IMS network) can choose to terminate the call and release all resources occupied by this call; or the UE in the CS network sends a call retrieval request to recover the call, proceed to step S309, go on with the conversation, and continue receiving and sending media streams.

Step S309: Through a response message of the USSD format, the ICS UE sends a call retrieval request to the ICS AS.

The re-INVITE is a call hold request of the SIP format. The signaling uses "sendrecv" to indicate that the ICS UE expects to recover the call and resume receiving and sending media streams.

The re-INVITE is forwarded to the ICS AS through an S-CSCF.

Step S310: The ICS AS returns a re-INVITE to the S-CSCF.

Described above is a normal IMS processing process.

Step S311: The S-CSCF sends a re-INVITE to the peer device.

As well, this signaling uses "sendrecv" to instruct the peer device to resume sending media streams and go on receiving media streams.

Step S312: The peer device sends a 200 OK as a confirmation.

Step S313: The S-CSCF sends a 200 OK to the ICS AS.

Step S314: The ICS AS sends a response message of the USSD format to the MGCF through an S-CSCF.

This signaling uses "sendrecv" to instruct the MGCF to resume receiving and go on sending the media streams. Correspondingly, the peer device resumes sending the media streams.

The MGCF controls the IMS-MGW to resume receiving media streams from the peer device and go on sending media streams to the peer device.

Step S315: The MGCF sends a 200 OK message to the S-CSCF as a confirmation, and the message is forwarded to the ICS AS.

Step S316: The ICS AS sends a response message of a USSD format to the ICS UE through an S-CSCF to confirm success of retrieving the call.

In the technical solution under the present invention, the UE in the CS network partially releases the radio resources after initiating the call hold operation, and therefore, the UE in the CS network can play local media files to the peer device after the call is held, thus saving network resources and improving the user experience.

Figure 4:
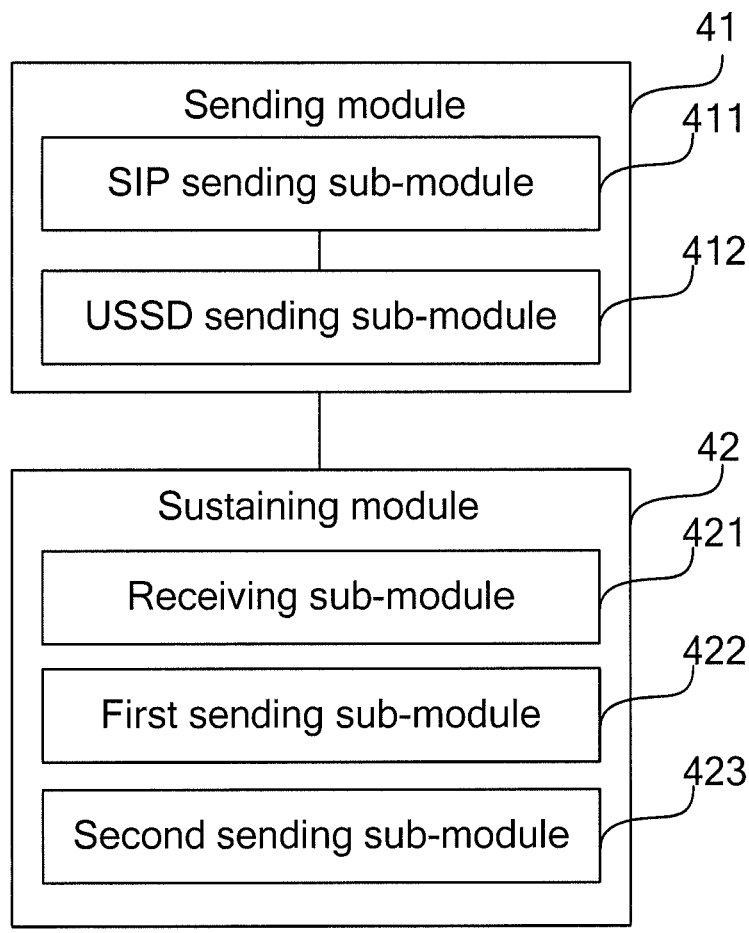
FIG. 4 shows a structure of a UE according to the fourth embodiment of the present invention.

FIG. 4 shows a structure of a UE in the fourth embodiment of the present invention. The UE includes:

a sending module 41, configured to: send a call hold request or call retrieval request to the IMS network server, namely, ICS AS, where the call hold request carries an indication that the UE will continue sending media streams; and a sustaining module 42, configured to sustain the CS network channel after the sending module 41 sends the call hold request.

The sending module 41 includes at least one of the following sub-modules:

a SIP sending sub-module 411, configured to send a call hold request or call retrieval request to an IMS network server through a SIP signaling; and a USSD sending sub-module 412, configured to: send a call hold request or call retrieval request to the IMS network server through a USSD signaling, where the call hold request carries an indication that the UE will continue sending media streams.

The sustaining module 42 further includes:

a receiving sub-module 421, configured to receive media streams;

a first sending sub-module 422, configured to send media streams; and a second sending sub-module 423, configured to collect media signals in real time for media coding and send the media streams.

When the radio air interface resources of the ICS UE still exist, the receiving sub-module 421 goes on receiving media stream data, for the purpose of keeping the connection only, without performing other operations; the ICS UE stops decoding the received media streams, and continues encoding the media signals and sending them to the peer device. The media streams further include local media files.

After the call is held, the ICS UE and the peer device (namely, the UE in the CS network and the UE in the IMS network) can choose to terminate the call and release all resources occupied by this call; or the UE in the CS network sends a call retrieval request to recover the call, go on with the conversation, and continue receiving and sending media streams.

Figure 5:
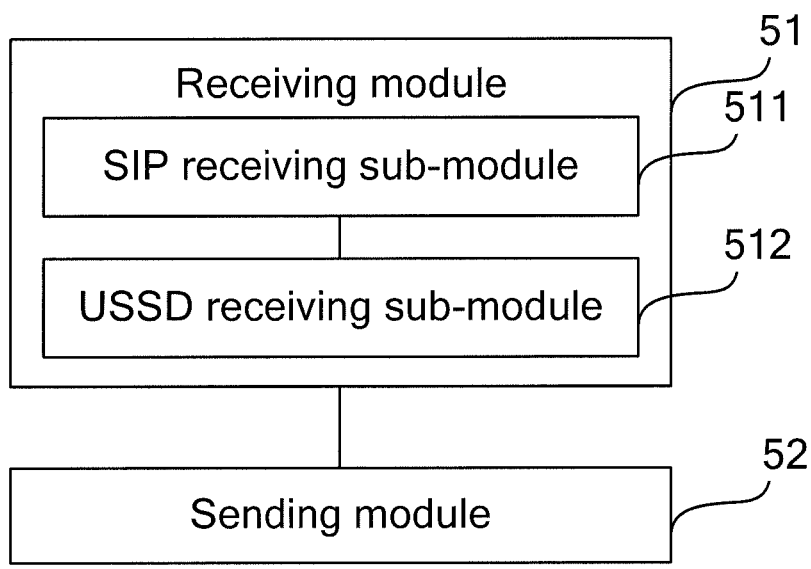
FIG. 5 shows a structure of an IMS network device according to the fifth embodiment of the present invention.

FIG. 5 shows an IMS network device in the fifth embodiment of the present invention. The IMS network device includes:

a receiving module 51, configured to: receive a call hold request or call retrieval request sent by a UE in the CS network, where the call hold request carries an indication that the UE in the CS network will continue sending media streams; and a sending module 52, configured to send a signaling indicative of holding or retrieving the call to the peer device according to the call hold request or call retrieval request received by the receiving module 51.

The receiving module 51 includes at least one of the following sub-modules: a SIP receiving sub-module 511, and a USSD receiving sub-module 512.

The SIP receiving sub-module 511 is configured to receive the call hold request or call retrieval request from the UE in the CS network through a SIP signaling. The SIP receiving sub-module 511 receives the call hold request or call retrieval request forwarded by the S-CSCF and sent through a re-INVITE. The SIP receiving sub-module 511 returns a re-INVITE to the S-CSCF, and the S-CSCF sends the re-INVITE to the peer device, namely, the UE in the IMS network.

The USSD receiving sub-module 512 is configured to receive the call hold request or call retrieval request from the UE in the CS network through a USSD signaling. The USSD receiving sub-module 512 receives the call hold request or call retrieval request forwarded by the S-CSCF and sent through a re-INVITE. The USSD receiving sub-module 512 returns a re-INVITE to the S-CSCF, and the S-CSCF sends the re-INVITE to the peer device, namely, the UE in the IMS network.

The signaling for sending the call hold request uses "sendonly" to indicate that the ICS UE will go on sending media streams. The signaling for sending the call retrieval request uses "sendonly" to instruct the peer device to: hold the call (namely, the UE in the IMS network stops sending media streams to the network); and go on receiving media streams.

After reading the foregoing embodiments, those skilled in the art are clearly aware that the present invention may be implemented through hardware, or through software in addition to a necessary universal hardware platform. Therefore, the technical solution under the present invention may be embodied as a software product. The software product may be stored in a non-volatile storage medium (such as CD-ROM, USB flash disk, or mobile hard disk), and may include several instructions that enable a computer device (such as personal computer, server, or network device) to perform the methods provided in the embodiments of the present invention.

In view of the above, although the present invention has been described through several exemplary embodiments, the invention is not limited to such embodiments. Any modification, equivalent substitution or improvement without departing from the spirit and principle of the present invention should be covered in the scope of protection of the present invention.

What is claimed is:

1. A method for holding calls between networks, comprising:
   receiving, by an IP Multimedia Subsystem (IMS) network server, a call hold request sent by an IMS Centralized Service (ICS) User Equipment (UE) in a Circuit Switched (CS) network, wherein the call hold request carries an indication that media streams continues to be sent to a peer User Equipment (UE) by the ICS UE, and
   sending, by the IMS network server, the received call hold request indicating the peer UE shall stop sending media streams, and continue receiving media streams from the ICS UE.

2. The method for holding calls between networks according to claim 1, wherein the receiving, by the IMS network server, the call hold request sent by the ICS UE in the CS network comprises:
   receiving, by the IMS network server, the call hold request sent by the ICS UE in the CS network through a Session Initiation Protocol (SIP) signaling; or
   receiving, by the IMS network server, the call hold request sent by the ICS UE in the CS network through an Unstructured Supplementary Service Data (USSD) signaling.

3. The method for holding calls between networks according to claim 1, wherein after sending, by the IMS network server, to the peer UE, the method further comprises:
   receiving, by the IMS network server, a call retrieval request sent by the ICS UE in the CS network; and
   instructing, by the IMS network server, the peer UE to resume receiving and sending the media streams.

4. The method for holding calls between networks according to claim 3, wherein the receiving, by the IMS network server, of the call retrieval request sent by the ICS UE in the CS network comprises:
   receiving, by the IMS network server, the call retrieval request sent by the ICS UE in the CS network through a Session Initiation Protocol (SIP) signaling; or
   receiving, by the IMS network server, the call retrieval request sent by the ICS UE in the CS network through an Unstructured Supplementary Service Data (USSD) signaling.

5. An IP Multimedia Subsystem (IMS) network server, comprising:
   a receiving module, configured to: receive a call hold request sent by a an IMS Centralized Service (ICS) User Equipment (UE) in a Circuit Switched (CS) network, wherein the call hold request carries an indication that the ICS UE continues sending media streams to a peer UE; and
   a sending module, configured to send the received call hold request indicating the peer UE shall stop sending media streams, and continue receiving media streams from the ICS UE.

6. The IMS network server of claim 5, wherein the receiving module comprises one or more of the following sub-modules:
   a Session Initiation Protocol (SIP) receiving sub-module, configured to receive the call hold request from the ICS UE in the CS network through a SIP signaling; and
   an Unstructured Supplementary Service Data (USSD) receiving sub-module, configured to receive the call hold request from the ICS UE in the CS network through a USSD signaling.

7. The IMS network server of claim 5, wherein the receiving module is further configured to receive a call retrieve request sent by the ICS UE; and
   the sending module is further configured to send a signaling to the peer UE for instructing the peer UE to resume sending media streams to the ICS UE.

* * * * *